United States Patent
Morgenthaler

[19]

[11] Patent Number: 6,098,926
[45] Date of Patent: Aug. 8, 2000

[54] COMPOSITE FAIRING WITH INTEGRAL DAMPING AND INTERNAL HELMHOLZ RESONATORS

[75] Inventor: David R. Morgenthaler, Littleton, Colo.

[73] Assignee: Lockheed Martin Corporation, Bethesda, Md.

[21] Appl. No.: 09/130,064

[22] Filed: Aug. 6, 1998

[51] Int. Cl.[7] .................................................. B64C 1/40
[52] U.S. Cl. ...................... 244/119; 181/292; 244/1 N; 244/133; 244/118.5
[58] Field of Search .................... 244/1 N, 119, 244/118.5, 133; 181/292, 290, 213, 214, 212; 428/116, 117, 118

[56] References Cited

U.S. PATENT DOCUMENTS

| | | | |
|---|---|---|---|
| 3,887,031 | 6/1975 | Wirt | 181/33 G |
| 3,910,374 | 10/1975 | Holehouse | 181/33 G |
| 3,991,849 | 11/1976 | Green et al. | 244/1 N |
| 4,084,367 | 4/1978 | Saylor et al. | 181/292 |
| 4,150,732 | 4/1979 | Hoch et al. | 181/292 |
| 4,155,211 | 5/1979 | Saylor et al. | 181/295 |
| 4,187,027 | 2/1980 | Dean, III et al. | 181/286 |
| 4,231,447 | 11/1980 | Chapman | 181/213 |
| 4,292,375 | 9/1981 | Ko | 244/119 |
| 4,298,090 | 11/1981 | Chapman | 181/286 |
| 4,416,349 | 11/1983 | Jacobs | 181/208 |
| 4,433,751 | 2/1984 | Bonneau | 181/213 |
| 4,562,901 | 1/1986 | Junger et al. | 181/285 |
| 4,674,712 | 6/1987 | Whitener et al. | 244/119 |
| 4,751,979 | 6/1988 | Wiseman | 181/213 |
| 4,787,473 | 11/1988 | Fuchs et al. | 181/224 |
| 4,821,841 | 4/1989 | Woodward et al. | 181/286 |
| 4,944,362 | 7/1990 | Motsinger et al. | 181/213 |
| 5,445,861 | 8/1995 | Newton et al. | 428/116 |
| 5,581,054 | 12/1996 | Anderson et al. | 181/213 |
| 5,670,758 | 9/1997 | Borchers et al. | 181/286 |
| 5,690,035 | 11/1997 | Hatayama et al. | 244/119 |
| 5,904,318 | 5/1999 | Towfig | 244/119 |
| 5,923,003 | 7/1999 | Arcas et al. | 181/292 |

*Primary Examiner*—Galen L. Barefoot
*Attorney, Agent, or Firm*—Holme Roberts & Owen LLP

[57] ABSTRACT

A tunable, mechanical and acoustical damping system is integrated into a lightweight composite aerospace vehicle structure. In one embodiment, the damping system (22) is incorporated into the wall of a spacecraft payload fairing (12) and includes an outer skin (24), a grid structure (26), an inner skin (28) and a tuning conduit (30). The grid structure (26) forms a number of cells (36) some of which may be interconnected. The cell volumes and the tuning conduit (30) are effective as a Helmholz resonator to reduce potentially damaging noise in the payload compartment (20) of the fairing (12). By appropriate selection of the conduit's dimensions in conjunction with the cell dimensions, the resulting resonator can be tuned to damp a selected frequency or frequencies. For example, a resonant frequency of the fairing (12) with its payload (18). A viscoelastic material (34) is provided between the grid structure (26) and inner skin (28) for mechanical damping. The system (22) can be implemented in lightweight composite materials and allows for SNAPSAT construction.

36 Claims, 4 Drawing Sheets

COMPOSITE FAIRING WITH INTEGRAL DAMPING AND INTERNAL HELMHOLZ RESONATORS

FIELD OF THE INVENTION

The present invention relates in general to acoustical damping systems for aerospace vehicles and, in particular, to a tunable acoustical damping system that is incorporated into a lightweight composite structural panel. The invention is especially useful in constructing lightweight spacecraft payload fairings with less mass and increased useable payload volume.

BACKGROUND OF THE INVENTION

Acoustical damping is a significant concern for certain structural components of aerospace vehicles including aircraft and spacecraft. In particular, acoustical damping is often required to protect instrumentation from damage due to the noise generated by vehicle thrust/propulsion systems. For example, acoustical damping is generally used to protect spacecraft payloads from the noise generated by launch vehicle thrusters and, in certain cases, is desirable to protect aircraft instrumentation from noise generated by aircraft engines. In some cases, it has been estimated that instruments inside an unprotected payload fairing would experience in excess of 150 dB due to the launch vehicle thrusters if left unprotected. Such noise levels can damage or incapacitate sensitive payload instruments, resulting in aborted missions, suboptimal spacecraft performance and substantial scientific or commercial losses. In order to provide the desired acoustical damping, aerospace vehicles are often equipped with acoustical add-ons or liners. Such liners include passive damping systems such as fiber glass or other insulating liners and active damping systems such as any of various dynamic sound attenuating systems. In either case, such systems are typically attached to an inside surface of the vehicle structure so as to provide a lining around the volume to be protected.

These liners generally impose certain limitations on mission design. In some cases, such liners provide inadequate damping or damping that is poorly matched to a potentially damaging frequency, frequency range, or ranges. In addition, such liners often involve substantial extra mass thereby limiting payload potential. In all cases, the use of a liner inside the vehicle structure reduces the vehicle volume that is available for instrumentation or other payload systems.

Active Helmholz resonators have been proposed for certain aerospace vehicle applications. However, these have generally been proposed as liners or other add-ons with attendant weight/volume limitations, have not provided adequate or selective damping and/or have not addressed lightweight composite construction such as SNAPSAT applications.

SUMMARY OF THE INVENTION

The present invention is directed to an acoustical damping system for an aerospace vehicle that is integrated into and forms a part of a lightweight vehicle structure. The acoustical damping system provides active damping and can be tuned to damp a particular frequency or frequency range or ranges of interest, thereby enhancing protection of sensitive instruments or other payload. Moreover, because the damping system is integrated into the vehicle structure, damping is accomplished without unduly increasing overall mass and without substantially reducing useable payload volume. The invention thereby accommodates lightweight construction including SNAPSAT construction.

According to one aspect of the invention, an acoustical damping system is incorporated into a composite structural panel of an aerospace vehicle. The panel includes a grid structure sandwiched between inner and outer skins where the panel forms a wall portion of the vehicle. At least one of the outer skin, grid structure and inner skin is formed from a lightweight composite material, for example, a carbon composite such as graphite epoxy. In one embodiment, all of the above-referenced components are formed from graphite epoxy. The grid structure, which may be, for example, an isogrid or orthogrid structure, defines a number of grid cells. The acoustical damping system further includes a conduit that extends through the inner skin from an interior portion of the vehicle to one of the grid cells. If desired, the cells and/or the conduit may be filled with a batting material for additional damping. The conduit and cells cooperate to define an internal Helmholz resonator for dynamic acoustical damping so as to protect instrumentation or personnel/payload within the aerospace vehicle. In addition, because the damping system is integrated into the vehicle structure, overall mass requirements are reduced and useable payload volume is increased.

According to another aspect of the invention, the acoustical damping system can be tuned to a particular frequency or frequencies of interest. The damping system includes a grid structure sandwiched between inner and outer skins, and a conduit, which may generally be constructed as described above. The conduit and grid cell(s) cooperate to act as a Helmholz resonator. The resonant frequency of this resonator is determined, as described in detail below, by the dimensions of the grid cell(s) and the conduit. This frequency can be readily turned, as desired, by appropriate selection of the relevant dimensions, e.g., the length of the conduit. For example, in the case of a spacecraft payload fairing, the length of the conduit extending through the inner skin to the grid cell(s), can be selected so that the acoustical damping system is tuned to a resonant frequency of the fairing and payload. A corresponding method for tuning the acoustical system would include the steps of determining a resonant frequency of the spacecraft and payload, determining the dimensions of a grid cell or cells, selecting a conduit length based on the grid cell dimensions, and positioning the conduit such that it extends through the inner skin to interconnect the spacecraft interior to the grid cell(s).

According to another aspect of the present invention, the acoustical damping system is incorporated into an aerospace vehicle structure that includes a large cellular structure to provide a desirable combination of lightweight, stiffness and damping characteristics. In this regard, the acoustical system includes a grid structure having a number of cells where each cell has a major dimension of at least about 6 in. The grid structure is sandwiched between inner and outer skins, and the acoustical system further includes at least one conduit that interacts with the cells to provide a Helmholz resonator. In a preferred embodiment, the cells have a rectangular cross section with a width of at least about 6 in, a length of at least about 6 in, and a depth measured from the inner skin to the outer skin, of at least about 3 inches and, more preferably about 6 inches. The grid may be formed from a composite material such as graphite epoxy. The large cell structure provides a substantial volume for Helmholz resonator damping. In addition, the grid structure can be implemented with lightweight materials and still provides suitable stiffness for a variety of aerospace applications.

According to a further aspect of the present invention, the acoustical damping system incorporates active Helmholz resonator damping using interconnected resonator volumes. The damping system includes a grid structure defining a number of grid cells sandwiched between inner and outer skins. At least two of the grid cells are interconnected thereby defining interconnected cells. For example, the cells may be interconnected by way of an opening formed in the grid structure between the cells or a space provided between the grid structure and one of the skins between the cells. A conduit extends through the inner skin into one of the interconnected cells. By virtue of this structure, multiple Helmholz resonator volumes are provided while employing a simplified construction.

According to a still further aspect of the present invention, the damping system employs a degree of mechanical damping in combination with the active Helmholz resonator damping in a lightweight and compact structure. The system includes a grid structure defined by a number of intersecting grid elements sandwiched between inner and outer skins, and at least one conduit extending through the inner skin into the grid cell area. The outer skin is rigidly inter-connected to the grid structure. At the inner skin/grid interface, a viscoelastic material for mechanical damping is interposed between the inner skin and the grid structure at first and second portions of the interface and a third portion of the interface, disposed between the first and second portions, is free from intervening elastomeric material. For example, the elastomeric material may be provided only on certain grid elements (e.g., only on lengthwise elements or selected lengthwise elements) or on mounting flanges disposed on certain grid elements. Such construction reduces elastomeric material requirements while maintaining suitable mechanical damping, simplifies construction and allows for acoustical communication between certain grid cells.

BRIEF DESCRIPTION OF THE DRAWINGS

For a more complete understanding of the present invention, and further advantages thereof, reference is now made to the following detailed description taken in conjunction with the drawings, in which.

DETAILED DESCRIPTION

In the following description, the invention is set forth in the context of an acoustical and mechanical damping system incorporated into a spacecraft payload fairing structure. The invention has particular advantages for such an application because of the substantial noise experienced at the payload fairing due to the primary launch thrusters, the sensitivity of certain sophisticated equipment that is often carried into orbit in the payload fairing, and the typically severe mass and volume restraints of the spacecraft and its payload. It will be appreciated, however, that various aspects of the invention are applicable in other aerospace vehicle applications and in other environments.

Figure 1:
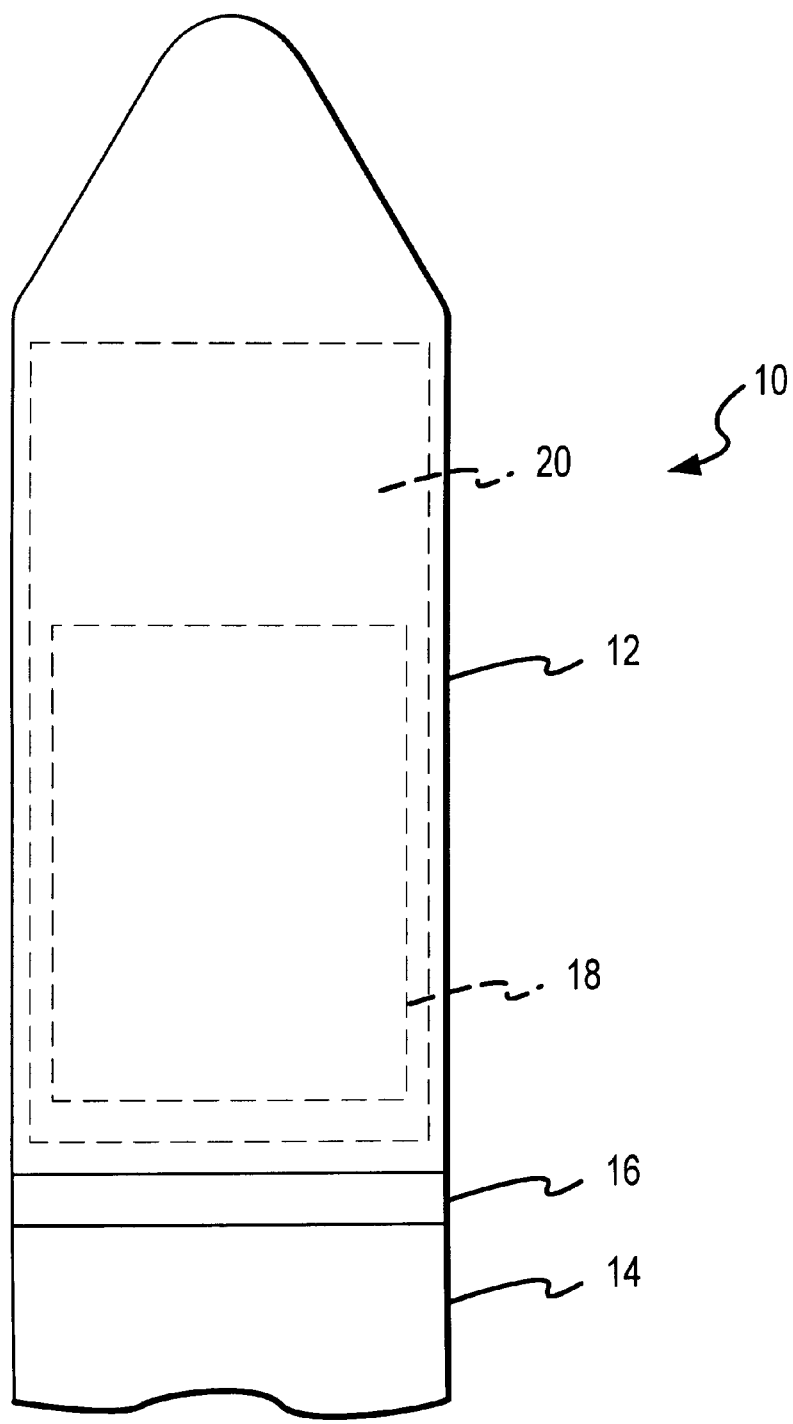
FIG. 1 is a partial side view showing a payload fairing according to the present invention mounted on the thruster stages of a launch vehicle.

FIG. 1 shows a partial view of a spacecraft 10 in connection with which the present invention may be implemented. The spacecraft 10 generally includes a payload fairing 12 mounted on a launch vehicle thruster stage or stages 14 by way of an explosive or other separation ring 16. The thruster stages 14 generally provide the principal thrust for launching the payload fairing 12 into orbit. Once in or near orbit, the separation ring 16 is used to separate the payload fairing 12 from the adjacent thruster stage 14. The fairing 12 contains the payload 18 that is to be delivered to orbit. Depending on the nature of the mission, the payload 18 may include a satellite or other payload spacecraft, or remote sensing, telemetry, guidance and/or various other technical or scientific equipment. The payload 18 is carried in the payload compartment 20 of fairing 12.

In order to generate the thrust required to launch the payload fairing 12 into orbit, the thruster stages 14 generally include a number of solid or liquid rocket boosters. The boosters generate tremendous noise and mechanical vibration. This noise and vibration is experienced at the payload fairing 12 and can result in damage to sensitive payload equipment if unabated. However, it will be appreciated that the mass and volume available for attenuating such vibration and noise is limited. The present invention, as set forth in more detail below, provides a mechanical and acoustical damping system that is incorporated into a lightweight composite payload fairing structure so as to provide the desired damping without unduly increasing the mass, or unduly decreasing the usable payload volume, of the payload fairing 12.

Figure 2:
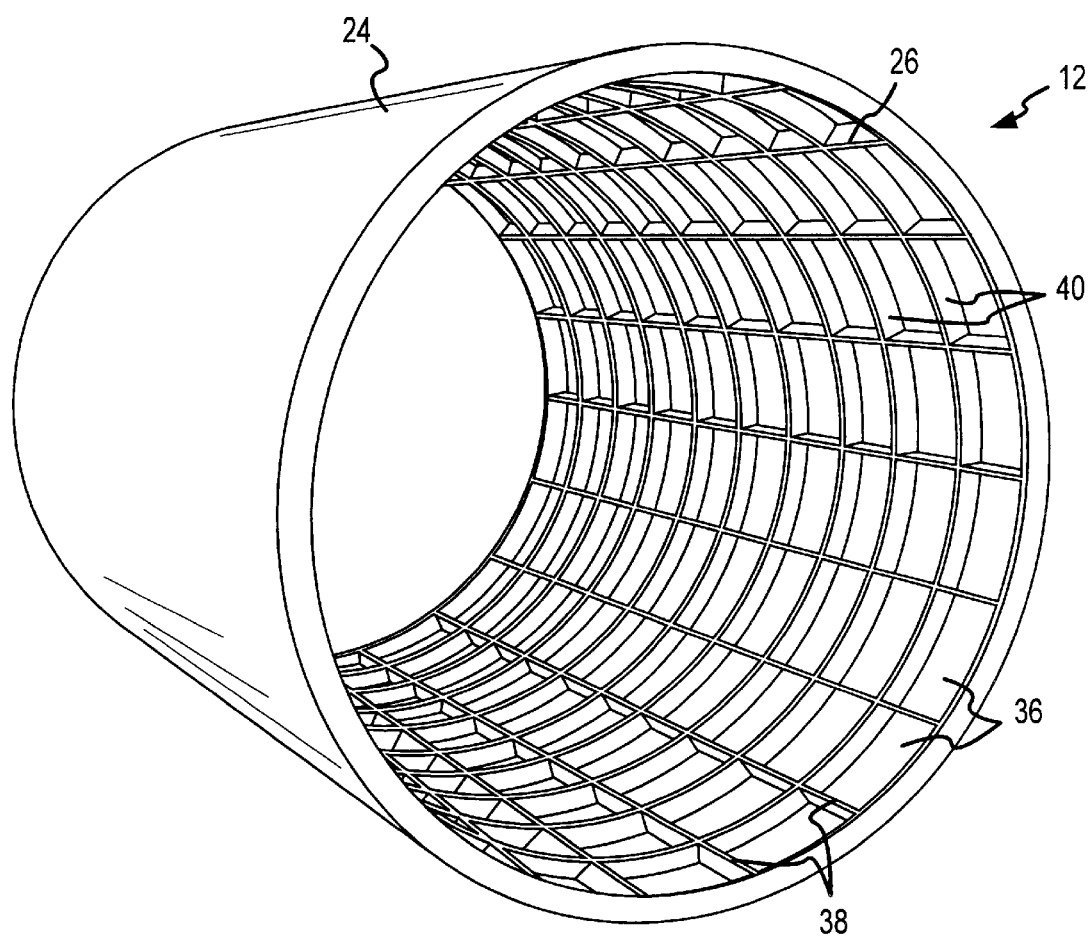
FIG. 2 is a perspective view showing a portion of the payload fairing of FIG. 1.
Figure 3:
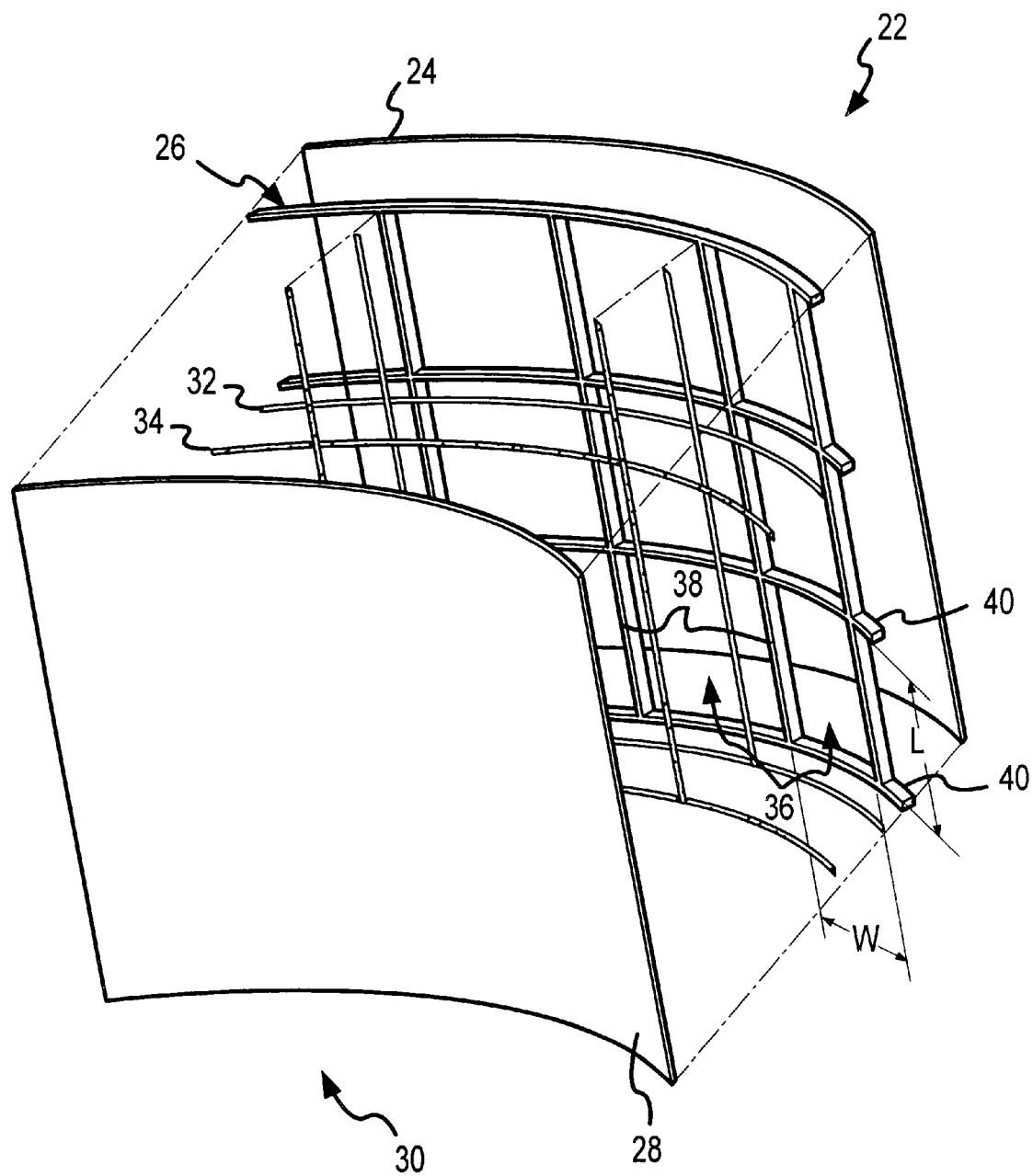
FIG. 3 is an exploded, perspective view of a portion of the payload fairing of FIG. 1.
Figure 4:
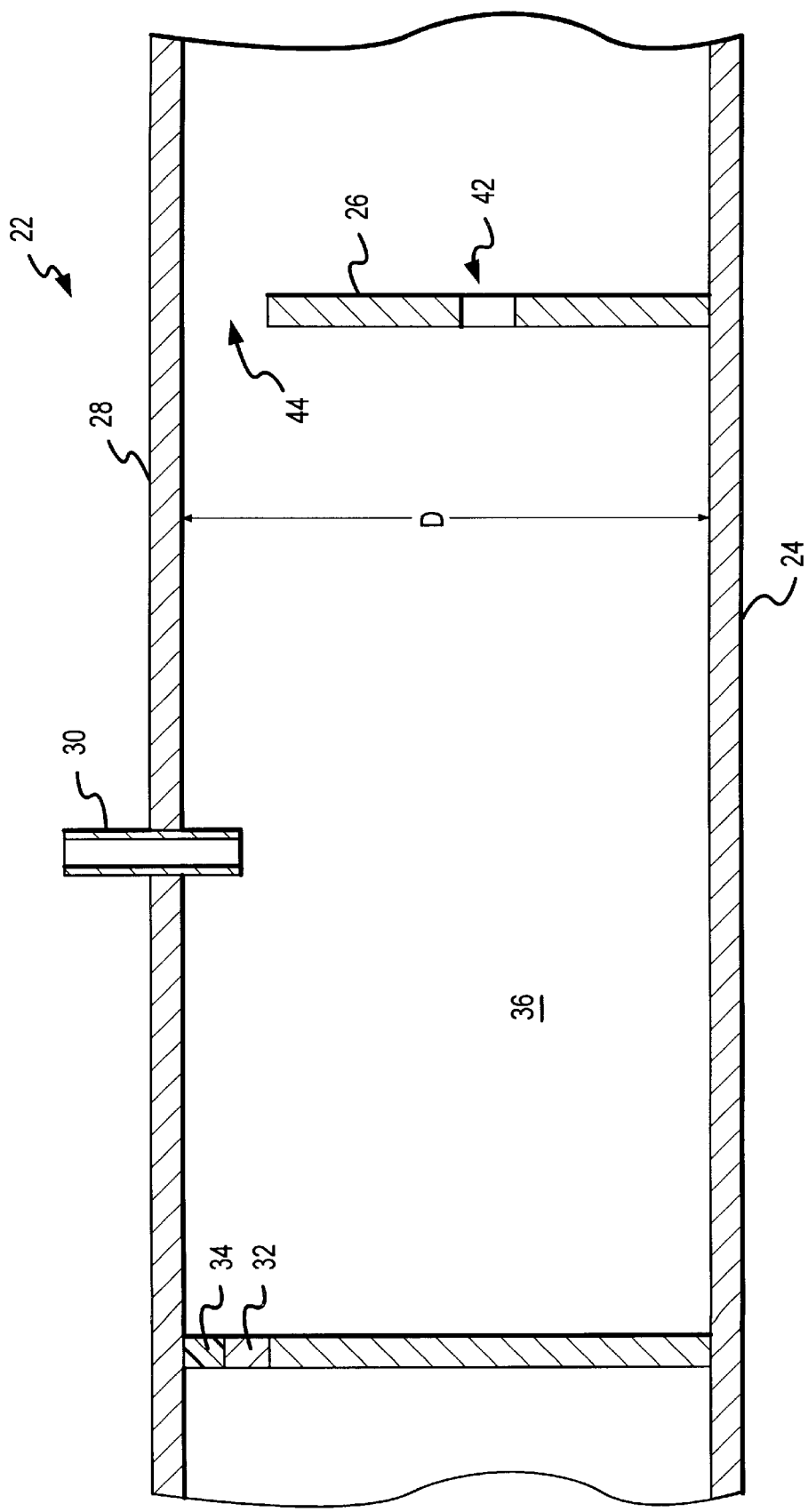
FIG. 4 is a cross sectional view of a portion of the payload fairing of FIG. 1.

Referring to FIGS. 2–4, various views of the damping system 22 of the present invention are shown. In particular FIG. 2 shows a perspective view of a cylindrical portion of the payload fairing 12 into which the system 22 is incorporated. In FIG. 2, an inner skin of the fairing structure of the present invention is not shown such that an internal structure of the fairing 12 is exposed. FIG. 3 shows an exploded, perspective view of a panel section of the fairing 12 including the damping system 22 of the present invention. FIG. 4 shows a cross-sectional view, taken along the length of the spacecraft 10, of a portion of the panel of FIG. 3.

The damping system 22 is incorporated into a wall of the payload fairing structure. Generally, the damping system 22 includes an outer skin 24, a grid structure 26, an inner skin 28, and a tuning conduit 30. As will be described in more detail below, the damping system 22 further includes a number of mounting flanges 32 and associated viscoelastic material 34 for use in mounting the inner skin 28 on the grid structure 26.

The grid structure 26 of the illustrated embodiment provides a number of desirable structural and acoustical characteristics. For example, the grid structure 26 imparts stiffness and strength to the outer skin 24 with minimal mass and structural complexity, and defines a number of large volume cells 36 for use in acoustical damping. The grid structure 26 also simplifies construction for faster, less expensive mission design and implementation. Preferably, the cells 36 are multilateral units, e.g., quadrilateral units, defined by intersecting linear ribs, as opposed to honeycomb or other more complicated structural units, for simple, lightweight construction. As shown, the structure 36 preferably includes a number of longitudinal ribs 38 and a number of orthogonal, circumferential ribs 40. The ribs 38 and 40 are rigidly interconnected at rib intersections, and are also rigidly interconnected to the outer skin 24. In this regard, the grid structure 26 and outer skin 24 can be integrally formed, RF welded or otherwise interconnected in such a manner that the grid structure 26 and skin 24 effectively form a single stiff and rigid structural unit. The cells preferably have a longitudinal length, L, of a least about 6", for example, about 12", a circumferential width, W, of at least about 6", for example, about 12" and a depth, D, measured from the inner skin 28 to the outer skin 24, of at least about 3 inches, for example, about 6 inches.

The fairing 12 is preferably formed using lightweight composite construction. That is, at least one of the outer skin 24, grid structure 26 and inner skin 28, is formed from a lightweight, composite material. More preferably, each of the outer skin 24, grid structure 26 and inner skin 28 is formed from a composite material such as a carbon composite. In the illustrated embodiment, the grid is formed from a graphite epoxy material and may be, for example, an isogrid or orthogrid manufactured by Composite Optics Incorporated. The illustrated outer and inner skins 24 and 28 are formed from sheets of graphite epoxy and may be about 0.05" thick. The grid 26 and skins 24 and 28 can be conveniently cut using waterjets to the proper shapes and assembled to form the fairing 12, thus allowing for low cost SNAPSAT construction. In this regard, it is noted that the illustrated grid structure has desirable bending characteristics in relation to certain honeycomb or other spacecraft structural units.

The conduits 30, which may also be formed from a lightweight composite material or any other suitable material, cooperate with the volumes defined by the cells 36 to provide Helmholz resonator acoustical damping. In this regard, the conduits 30 extend through the inner skin 28 such that one open end of each of the conduits is exposed to the payload compartment 20 (i.e., the fairing interior) and the other open conduit end is exposed to at least one cell 36. The damping effect of the resulting resonator is generally given by:

$$f \propto \frac{1}{2\pi} \sqrt{\frac{A}{VL}}$$

where A is the cross-section area of the conduit 30, L is the length of the conduit, and V is the volume of gas (e.g., air or helium) enclosed by the cell or cells 36. For low frequencies, the resonant frequency is substantially independent of the shape of the volume.

It will thus be appreciated that the integral resonators of the damping system 22 can be tuned to a desired frequency or frequencies. In particular, by appropriate selection of the resonator cell volumes and conduit dimensions, the various resonators may be tuned to a frequency or frequencies at which the internal acoustics of the fairing 12 with payload 18 have resonances so as to provide a high level of absorption of sound waves at such frequencies. The internal Helmholz resonator volume can be varied by grid selection and/or by interconnecting two or more cells 36 for enhanced volume. As shown in FIG. 4, adjacent cells 36 can be interconnected by providing openings 42 in the grid structure 26 between the cells 36, or by providing clearances 44 between the grid structure 36 and skin 28 to selectively interconnect cells 36. The dimensions of the conduits 30, and especially the lengths of the conduits, can be easily varied for tuning purposes. In this regard, multiple frequencies of interest can be damped by varying the lengths of the various conduits 30. Additionally, a range of frequencies can be damped, to some degree, by cutting angularly through a conduit 30 so that its length defines a range. The damping may be optimized by locating and tuning the resonators based on high sound pressure level locations for the various internal acoustical modes of the fairing 12 with payload 18 as determined by acoustical analysis. If desired, fiberglass batting or other porous and lossy material may be provided in the conduit 30 or within the cells 36 for additional damping.

The damping system 12 provides mechanical damping as well as acoustical damping to reduce noise due to dynamic and acoustical sources. Such mechanical damping is provided in the illustrated embodiment by resiliently interconnecting the inner skin 28 to the grid structure 26. The resulting resilient interface attenuates mechanical vibrations, i.e., inhibits transmission of such vibrations, thereby reducing noise in the payload compartment 20. As shown in FIGS. 3 and 4, the inner skin 28 is applied to the grid structure 26 using intermittent fasteners in cooperation with flanges 32 and strips of viscoelastic material 34, for example, Mactac 2012, interposed between the flanges 32 and skin 28. The viscoelastic material 34 in the illustrated embodiment is provided only at the ribs 38 and 40, and not across the entire structural grid/inner skin interface, thereby reducing material requirements and mass. The flanges 32 may be provided along selected ribs 38, e.g., every third longitudinal and circumferential rib 38 and 40. In addition to providing mechanical damping, the flanges 32 and viscoelastic material 34 facilitate selective interconnection of groups of cells 36. In this regard, where flanges 32 are provided on every third longitudinal and circumferential rib 38 and 40, groups of nine acoustically cooperating cells 36 are defined.

The invention thereby provides integral, tunable, mechanical and acoustical damping in conjunction with a lightweight composite structure. Additionally, the invention does not unduly reduce effective payload volume, and allows for SNAPSAT or other convenient, low cost construction.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A damping system for use in a wall of an aerospace vehicle, comprising: a structural panel assembly, including:

an outer skin forming an external surface of said aerospace vehicle;

an inner skin facing an internal area of said aerospace vehicle;

a grid structure, interposed between said outer skin and said inner skin, for stiffening said outer skin, said grid structure defining a number of cells in a volume between said outer skin and said inner skin, certain ones of said cells being acoustically interconnected so as to allow flow of a gas therebetween thereby defining a selected interconnected cell volume;

wherein said structural panel assembly forms a structural wall portion of said aerospace vehicle; and a conduit extending through said inner skin from said internal area of said aerospace vehicle to said interconnected cells, said conduit having a length that is independent of a thickness of said inner skin and said conduit in combination with said interconnected cell volume defining a Helmholz resonator for acoustically damping a first frequency of said internal area of said aerospace vehicle, wherein selection of said interconnected cell volume and said length of said conduit provides for enhanced tuning of said Helmholz resonator relative to said first frequency.

2. A damping system as set forth in claim 1, wherein at least one of said external skin and said grid structure comprises a carbon composite material.

3. A damping system as set forth in claim 2, wherein said carbon composite material is a graphite epoxy.

4. A damping system as set forth in claim 1, wherein each of said inner skin, grid structure and outer skin is formed from a carbon composite material.

5. A damping system as set forth in claim 1, wherein said outer skin and grid structure are rigidly interconnected.

6. A damping system as set forth in claim 1, wherein said outer skin and grid structure are one of integrally formed and welded together.

7. A damping system as set forth in claim 1, wherein said grid structure comprises one of an orthogrid and an isogrid.

8. A damping system as set forth in claim 1, wherein each of said cells has a cross-sectional dimension of at least 6".

9. A damping system as set forth in claim 1, wherein each of said cells has a depth, measured from said inner skin to said outer skin, of at least about 3 inches.

10. A damping system as set forth in claim 1, wherein each of said cells has a depth, measured from said inner skin to said outer skin, of at least about 6 inches.

11. A damping system as set forth in claim 1, wherein each of said cells has four sides defined by a first set of elongate, substantially parallel ribs and a second set of ribs and said second set of ribs intersecting to define said cells.

12. A damping system as set forth in claim 11, wherein each of said cells has a width of at least about 6" and a length of at least about 6".

13. A damping system as set forth in claim 1, further comprising a plurality of flanges disposed between said grid structure and said inner skin.

14. A damping system as set forth in claim 1, further comprising mechanical damping means disposed between said grid structure and said inner skin.

15. A damping system as set forth in claim 14, wherein said mechanical damping means comprises a viscoelastic material.

16. A damping system as set forth in claim 1, further comprising a batting material disposed within said cells to enhance an acoustic damping of said Helmholz resonator.

17. A damping system as set forth in claim 1, wherein said first frequency comprises a resonant frequency associated with said aerospace vehicle.

18. A damping system as set forth in claim 1, wherein a dimension of said conduit is selected, in conjunction with the dimensions of said interconnected cells, to provide damping at said first frequency.

19. A damping system as set forth in claim 1, wherein said aerospace vehicle comprises a spacecraft and said structural panel assembly forms a wall portion of a payload fairing.

20. A damping system for use in a wall of an aerospace vehicle, comprising: a structural panel assembly, including:
an outer skin forming an external surface of said aerospace vehicle;
an inner skin facing an internal area of said aerospace vehicle; and
a grid structure interposed between said outer skin and said inner skin, for stiffening said outer skin, said grid structure defining a number of cells and a volume between said outer skin and said inner skin;
at least two flanges interposed between said inner skin and said grid structure, said flanges providing a clearance between said inner skin and said grid structure so as to acoustically interconnect adjacent cells between said flanges;
wherein said structural panel assembly forms a structural wall portion of said aerospace vehicle; and
a conduit extending through said inner skin from said internal area of said aerospace vehicle to said interconnected adjacent cells, said conduit having a length that is independent of a thickness of said inner skin, said conduit in combination with said interconnected adjacent cells defining a Helmholz resonator for acoustically damping a first frequency of said internal area of said aerospace vehicle.

21. A damping system as set forth in claim 20, wherein both said grid structure and said outer skin comprise a lightweight carbon composite material and said grid structure and said outer skin are rigidly interconnected.

22. A damping system as set forth in claim 20, wherein said carbon composite material is a graphite epoxy.

23. A damping system as set forth in claim 20, wherein each of said number of cells has four sides defined by a first set of elongate, substantially parallel ribs and a second set of elongate, substantially parallel ribs, said first set of ribs and said second set of ribs intersecting to define said cells.

24. A damping system as set forth in claim 20, wherein at least two of said number of cells are interconnected so as to allow flow of a gas therebetween.

25. A damping system as set forth in claim 20, further comprising mechanical damping means disposed between said grid structure and said inner skin.

26. A damping system as set forth in claim 25, wherein said mechanical damping means comprises a viscoelastic material.

27. A damping system as set forth in claim 20, further comprising a batting material disposed within said cells to enhance an acoustic damping of said Helmholz resonator.

28. A damping system as set forth in claim 20, wherein said first frequency comprises a resonant frequency associated with said aerospace vehicle.

29. A damping system as set forth in claim 20, wherein a dimension of said conduit is selected, in conjunction with the dimensions of said interconnected cells, to provide damping at said first frequency.

30. A damping system as set forth in claim 20, wherein said aerospace vehicle comprises a spacecraft and said structural panel assembly forms a wall portion of a payload fairing.

31. A damping system for use in a wall of an aerospace vehicle, comprising: a structural panel assembly, including:
an outer skin for forming an external surface of said aerospace vehicle;
an inner skin facing an internal area of said aerospace vehicle; and
a grid structure interposed between said outer skin and said inner skin, for stiffening said outer skin, said grid structure including a first set of elongate, substantially parallel ribs and a second set of elongate, substantially parallel ribs, said first set of ribs and said second set of ribs intersecting to define said cells, wherein each of said cells has a quadrilateral cross-section;
linear flanges interposed between said inner skin and said grid structure coincident with only certain ones of said first set of ribs, said flanges providing a clearance between said inner skin and said grid structure so as to acoustically interconnect adjacent cells between said flanges;
both said grid structure and said outer skin comprising a lightweight carbon composite material, said grid structure and said outer skin being rigidly connected;

wherein said structural panel assembly forms a structural wall portion of said aerospace vehicle; and a conduit extending through said inner skin from said internal area of said aerospace vehicle to said interconnected adjacent cells, said conduit in combination with said interconnected adjacent cells defining a Helmholz resonator for acoustical damping a first frequency of said internal area of said aerospace vehicle.

32. A damping system as set forth in claim 31, wherein at least two of said cells are interconnected so as to allow flow of a gas therebetween.

33. A damping system as set forth in claim 31, further comprising mechanical damping means disposed between said grid structure and said inner skin.

34. A method for tuning an acoustical damping system of an aerospace vehicle, said acoustical damping system including an inner skin, an outer skin, a grid structure defining a number of grid cells interposed between the inner and outer skins, and a tuning conduit, said method comprising the steps of:

determining a resonant frequency associated with a structure based on said determined resonant frequency of the aerospace vehicle;

selecting a resonator volume associated with the grid structure by interconnecting selected adjacent cells of said grid structure;

selecting a dimension of said tuning conduit based on said determined resonant frequency; and providing said tuning conduit with said selected dimension, wherein said selected resonator volume of said interconnected adjacent cells together with said selected dimension of said tuning conduit provides for enhanced tuning of an acoustic damping characteristic relative to said determined resonant frequency.

35. A method as set forth in claim 34, further comprising the step of positioning said provided tuning conduit such that it extends through the inner skin from an interior portion of the vehicle to at least one of the grid cells.

36. A method as set forth in claim 34, wherein said volume comprises a volume associated with at least one of said grid cells.

* * * * *